(12) United States Patent
Buvid et al.

(10) Patent No.: US 9,973,231 B1
(45) Date of Patent: May 15, 2018

(54) PROTECTIVE STRUCTURES TO PROVIDE IMPACT PROTECTION FOR PORTABLE DEVICES

(71) Applicant: International Business Machines Corporation, Armonk, NY (US)

(72) Inventors: Daniel J. Buvid, Rochester, MN (US); Eric J. Campbell, Rochester, MN (US); Sarah K. Czaplewski, Rochester, MN (US); Christopher W. Steffen, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/463,983

(22) Filed: Mar. 20, 2017

(51) Int. Cl.
| | |
|---|---|
| *H04M 1/00* | (2006.01) |
| *H04B 1/3888* | (2015.01) |
| *A45C 11/00* | (2006.01) |
| *A45C 13/00* | (2006.01) |
| *A45F 5/00* | (2006.01) |

(52) U.S. Cl.
CPC ............ *H04B 1/3888* (2013.01); *A45C 11/00* (2013.01); *A45C 13/001* (2013.01); *A45C 13/002* (2013.01); *A45F 5/00* (2013.01); *A45C 2011/002* (2013.01); *A45C 2011/003* (2013.01)

(58) Field of Classification Search
None
See application file for complete search history.

(56) References Cited

U.S. PATENT DOCUMENTS

| | | | |
|---|---|---|---|
| 5,613,223 A | 3/1997 | Ross et al. | |
| 8,152,071 B2 | 4/2012 | Doherty et al. | |
| 8,587,939 B2 | 11/2013 | McClure et al. | |
| 2003/0146610 A1* | 8/2003 | Chang | B60R 21/18 280/735 |

(Continued)

FOREIGN PATENT DOCUMENTS

WO 2013151871 A1 10/2013

OTHER PUBLICATIONS

Wai-Kai Chen, The Electrical Engineering Handbook, 2005, pp. 293-294.*

(Continued)

*Primary Examiner* — Mohammed Rachedine
(74) *Attorney, Agent, or Firm* — Patterson + Sheridan, LLP

(57) ABSTRACT

A method and apparatuses protecting a portable device from an impact are provided. An accelerometer is operable to detect acceleration of the portable device. A protective structure disposed outside of the portable device includes a substrate and an elastomeric layer arranged on the substrate. The elastomeric layer defines an inflatable region in which the elastomeric layer is not attached to the substrate. The substrate includes a fluid channel in fluid communication with a pressurized fluid source. A controller is operable to trigger the pressurized fluid source upon detection of an acceleration event, wherein the pressurized fluid source transmits pressurized fluid to the inflatable region, causing the inflatable regions to inflate. The inflatable regions provide a cushion against impacts with surfaces when the portable device is dropped or otherwise propelled toward a surface.

20 Claims, 5 Drawing Sheets

(56) References Cited

U.S. PATENT DOCUMENTS

| | | | |
|---|---|---|---|
| 2011/0012329 A1* | 1/2011 | Sekino | B60R 21/206 280/730.2 |
| 2011/0194230 A1* | 8/2011 | Hart | H04M 1/185 361/437 |
| 2015/0149408 A1 | 5/2015 | Lin | |
| 2015/0301565 A1 | 10/2015 | Manullang et al. | |
| 2015/0341070 A1 | 11/2015 | Sanford et al. | |

OTHER PUBLICATIONS

Kia Kokalitcheva, "This iPAD Mini Case Does a Magic Trick-It 'Grows' an Actual Keyboard," Feb. 12, 2015,[Available Online], http://venturebeat.com/2015/02/12/this-ipad-mini-case-does-a-magic-trick-it-grows-an-actual-keyboard/.

Webwire, "Introducing PHORM, a Dynamic Morphing Screen That Magically Provides Buttons on Touchscreesn That Are Only There When You Need Them and Gone When You Don't," Feb. 12, 2015, [Available Online], http://www. webwire.com/ViewPressRel.asp?ald=195892.

* cited by examiner

PROTECTIVE STRUCTURES TO PROVIDE IMPACT PROTECTION FOR PORTABLE DEVICES

BACKGROUND

Portable electronic devices, such as smartphones and tablet computers, are susceptible to damage if dropped on the ground or otherwise impact a hard surface. Many such devices have cracked screens, damaged housings, or malfunctioning components caused by such impacts. Protective cases may be added to portable electronic device to offer protection against impacts, but such protective cases are typically thin to avoid substantially increasing the size of the portable device. The protection provided by such a thin protective case may not be sufficient to protect the portable device from drops.

SUMMARY

According to one embodiment of the present invention, a portable device includes a housing and an accelerometer disposed in the housing. The accelerometer is operable to detect acceleration of the housing. The portable device also includes a pressurized fluid source disposed in the housing. The portable device also includes a protective structure disposed on a surface of the housing. The protective structure includes a substrate and an elastomeric layer arranged on the substrate. The elastomeric layer defines an inflatable region. A fluid channel fluidly couples the inflatable region with the pressurized fluid source. The portable device also includes a controller operable to trigger the pressurized fluid source upon detection of an acceleration event by the accelerometer. Upon triggering, the pressurized fluid source transmits pressurized fluid to the inflatable region through the fluid channel to cause the elastomeric layer to inflatably extend away from the substrate.

According to one embodiment of the present invention, a protective case for a portable electronic device includes a housing that receives a portable electronic device. The protective case also includes an accelerometer. The accelerometer is operable to detect acceleration of the housing. The protective case also includes a pressurized fluid source disposed in the housing. The protective case also includes a protective structure disposed on a surface of the housing. The protective structure includes a substrate and an elastomeric layer arranged on the substrate. The elastomeric layer defines an inflatable region. A fluid channel fluidly couples the inflatable region with the pressurized fluid source. The protective case also includes a controller operable to trigger the pressurized fluid source upon detection of an acceleration event by the accelerometer. Upon triggering, the pressurized fluid source transmits pressurized fluid to the inflatable region through the fluid channel to cause the elastomeric layer to inflatably extend away from the substrate.

According to one embodiment of the present invention, a method includes providing a portable device that includes a housing and an accelerometer disposed in the housing. The accelerometer operable to detect acceleration of the housing. The portable device also includes a pressurized fluid source disposed in the housing and a protective structure disposed on a surface of the housing. The protective structure includes a substrate and an elastomeric layer arranged on the substrate. The elastomeric layer defines an inflatable region, wherein a fluid channel fluidly couples the inflatable region with the pressurized fluid source. The portable device also includes a controller operable to trigger the pressurized fluid source upon detection of an acceleration event by the accelerometer. Upon triggering, the pressurized fluid source transmits pressurized fluid to the inflatable region through the fluid channel to cause the elastomeric layer to inflatably extend away from the substrate. The method also includes detecting an acceleration event of the portable device. The method also includes releasing pressurized fluid from the pressurized fluid source to inflate the elastomeric layer in the inflatable region.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In embodiments described herein, a portable device (e.g., a smart phone or a tablet computer) or a protective case for a portable device includes protective structures that are inflatable. In the event the portable device is dropped or is otherwise accelerating toward a collision, the protective structure inflates to cushion the collision with the ground or other hard surface. When the protective structure is uninflated, the protective structure is unobtrusive and does not significantly increase the size or form factor of the portable electronic device or the protective case.

Figure 1:
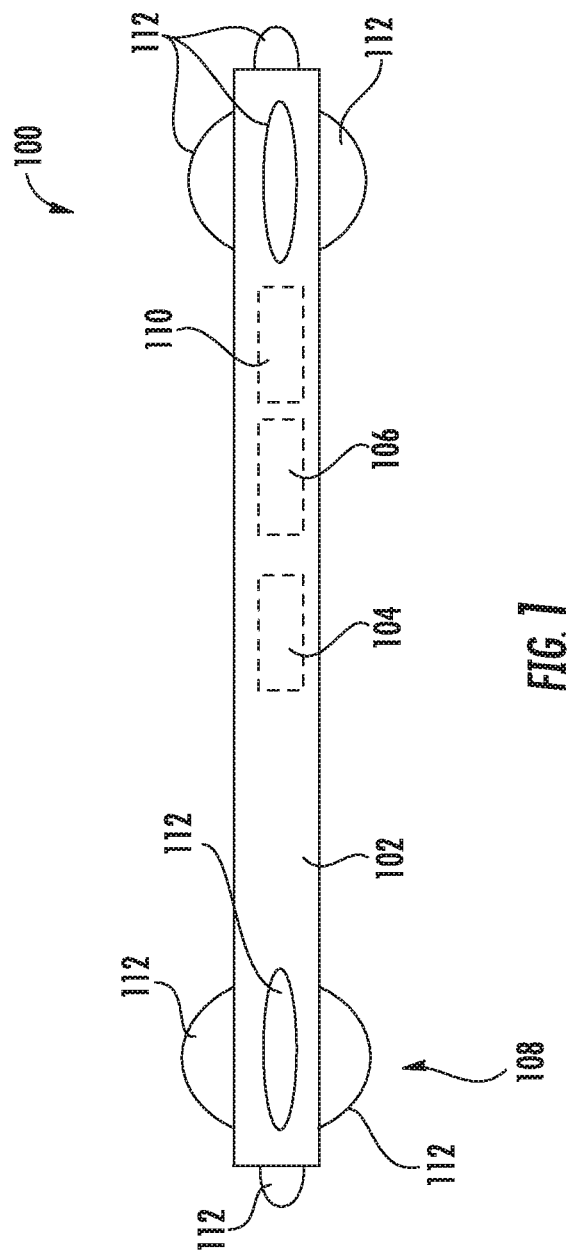
FIG. 1 is a side view of a portable device with a plurality of protective structures arranged thereon.

FIG. 1 is a side view of a portable device 100 that includes a housing 102 and a one or more protective structures 108 arranged there around. In various embodiments, the portable device 100 could be a smart phone or tablet computer, and more generally any device or object that may be subjected to impact forces caused by the acceleration of the device or object and subsequent collision with another object. The one or more protective structures 108 include one or more inflatable regions 112 that provide a cushion from an impact with a surface. For purposes of illustration, the inflatable regions 112 are shown in an inflated state. In this embodiment, the protective structure 108 on the portable device 100 includes inflatable regions 112 on front and back surfaces, top and bottom surfaces, and side surfaces. The portable device 100 also includes an accelerometer 104 disposed in the housing 102. The accelerometer 104 is operable to detect acceleration of the housing 102. For example, if the portable device 100 is dropped, then the accelerometer 104 detects acceleration associated with freefall. As another example, if the portable device 100 were accidentally thrown in a horizontal and/or vertical direction, the accelerometer 104 detects acceleration associated with such an action.

The portable device 100 also includes a pressurized fluid source 106 disposed in the housing 102. The pressurized fluid source 106 is in fluid communication with the protective structure(s) 108 such that the pressurized fluid from the pressurized fluid source 106 may be selectively transmitted to the inflatable region(s) 112 of the protective structure(s) 108 for inflation. The portable device 100 also includes a controller 110. The controller 110 is in communication with the accelerometer 104 and with the pressurized fluid source 106. In the event the accelerometer 104 detects an acceleration event, such as a freefall or high acceleration, the controller 110 is operable to trigger the pressurized fluid source 106 to transmit the pressurized fluid to the inflatable region(s) 112 of the protective structure(s) 108.

In one embodiment, the pressurized fluid source 106 is a microfluidic pump that pumps a liquid, such as water, glycols, alcohols, fluoro-carbon fluids, or any combinations thereof. In other embodiments, the microfluidic pump could pump different fluids or gases, such as air or nitrogen. In one embodiment, the pressurized fluid source 106 comprises an electrically-driven (e.g., solenoid driven) piston that moves in a first direction in a cylinder to push fluid out of a cylinder volume to inflate the inflatable region(s) 112 of the protective structure(s) 108 and moves in a second direction in the cylinder to draw fluid into the cylinder volume to deflate the inflatable region(s) 112 of the protective structure(s) 108. In various other embodiments, the pressurized fluid source 106 is a pressurized container of a liquid or gas. For example, the pressurized container could be a replaceable pressurized $CO_2$ canister. In such embodiments, the gas inflating the inflatable region(s) 112 of the protective structure(s) 108 is vented to the atmosphere when the inflatable region(s) 112 are deflated.

In at least one embodiment, the controller 110 can trigger the pressurized fluid source 106 to transmit the pressurized fluid to the protective structure(s) 108 in the event the portable device 100 is turned off. The portable device 100 is susceptible to impact damage regardless of whether it is turned on or turned off. However, when the portable device 100 is turned off, the accelerometer 104 may not be operable. As a result, the controller 110 does not know whether the portable device 100 is experiencing an acceleration event and therefore may not be able to trigger the pressurized fluid source 106 to transmit the pressurized fluid to the protective structures 108. Therefore, the controller 110 may trigger the pressurized fluid source 106 to transmit the pressurized fluid to the inflatable region(s) 112 of the protective structure(s) 108 if the portable device 100 is being turned off to ensure the portable device 100 is protected by the inflatable region(s) of the protective structure(s) 108.

Figure 2A:
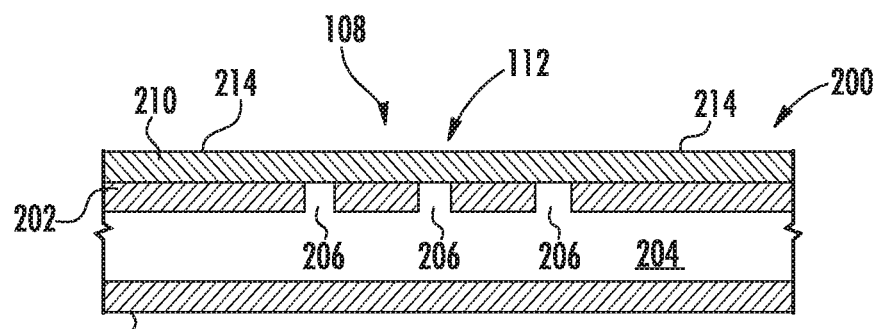
FIG. 2A is a detail cross-sectional view of a protective structure, wherein an elastomeric layer of the protective structure is in an uninflated state.
Figure 2B:
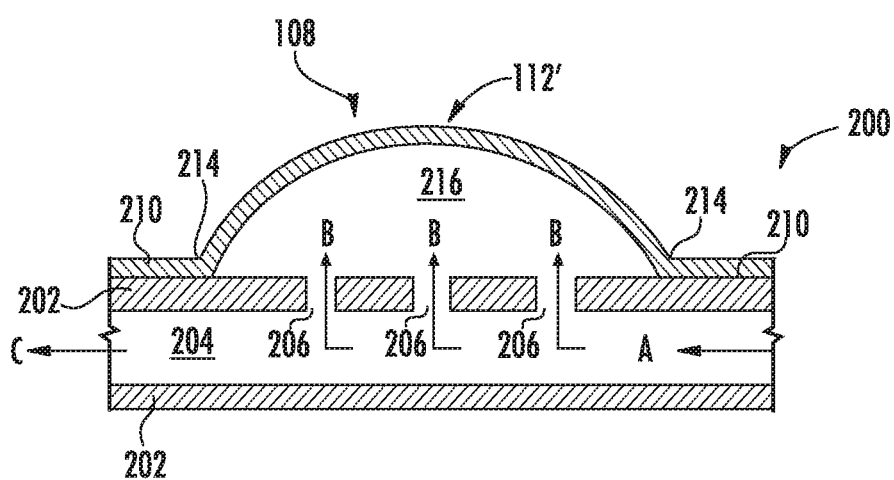
FIG. 2B is a detail cross-sectional view of the protective structure, wherein the elastomeric layer of the protective structure is in an inflated state.
Figure 2C:
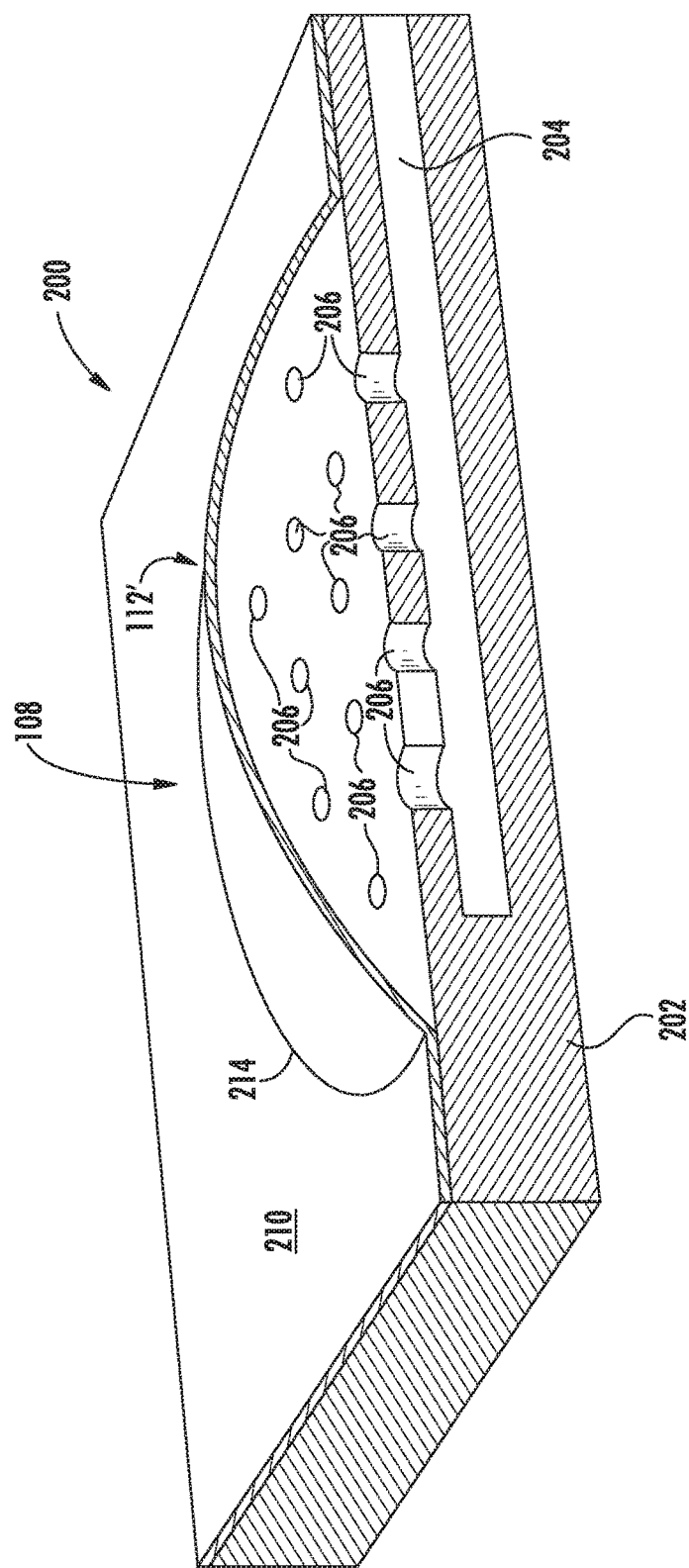
FIG. 2C is a perspective view of the protective structure of FIG. 2A, wherein the elastomeric layer of the protective structure is in the inflated state.

FIGS. 2A-2C are detailed cross-sectional views of a portion of a protective structure 108, wherein FIG. 2A illustrates the protective structure 108 with an inflatable region 112 in an uninflated state, and FIGS. 2B and 2C illustrate the portion of the protective structure 108 with the inflatable region 112 in an inflated state. The protective structure 108 is disposed on a surface of the housing 102 of the portable device 100 and includes a substrate 202 with an elastomeric layer 210 arranged on an outward-facing surface of the substrate 202. For example, the substrate 202 and the elastomeric layer 210 may be the outermost layers of the housing 102 of the portable device 100. Exemplary elastomeric materials include, but are not limited to, natural polyisoprene, synthetic polyisoprene, polybutadiene, chloroprene rubber, butyl rubber, styrene-butadiene rubber, nitrile rubber, ethylene propylene rubber, epichlorohydrin rubber, polyacrylic rubber, silicone rubber, fluorosilicone rubber, flouroelastomers, perflouroelastomers, polyether block amides, chlorosulfonated polyethylene, ethylene-vinyl acetate, thermoplastic elastomers, resilin proteins, elastin proteins, polysulfide rubber, and elastolefin. In at least one embodiment, the elastomeric layer 210 may be a self-healing material. The substrate may be glass, acrylic, plastic, metal, or other rigid material. In at least one embodiment, the thickness of the substrate 202 and elastomeric layer 210 is approximately one millimeter.

The elastomeric layer 210 is attached to the substrate 202, except that the inflatable region 112 of the elastomeric layer 210 is not attached to the substrate 202. The elastomeric layer 210 may be attached to the substrate 202 with an adhesive or epoxy. Leading lines from reference numerals 214 indicate boundaries of the inflatable region 112 where the elastomeric layer 210 is not attached to the substrate 202.

The substrate 202 includes at least one fluid channel 204, which is in communication with the pressurized fluid source 106. The substrate 202 also includes at least one aperture 206 between the at least one fluid channel 204 and the elastomeric layer 210 in the inflatable region 112. Referring now to FIG. 2B, when the controller 110 triggers the pressurized fluid source 106 to transmit pressurized fluid to the protective structure 108, the pressurized fluid travels through the fluid channel 204 in the direction of arrow A. At least some of the pressurized fluid passes through the at least one aperture 206 and urges the inflatable region 112 of the elastomeric layer 210 to inflatably extend away from the substrate 202, indicated by reference numeral 112'. The inflated inflatable region 112' of the elastomeric layer 210 and the substrate 202 form a pocket 216 there-between, which is filled with the pressurized fluid. The fluid-filled pocket 216 acts as a cushion such that the fluid-filled pocket 216 absorbs energy from a collision with a hard surface to prevent or reduce damage caused by an impact with the hard surface.

In at least one embodiment, the elastomeric layer 210 is porous at least at the inflatable region 112. For example, in at least one embodiment, the elastomeric layer 210 could comprise a material that is porous to the fluid used to inflate the inflatable regions 112. In other embodiments, the material of the elastomeric layer 210 may not be porous, but the elastomeric layer 210 may be perforated in the inflatable region 112 such that the fluid used to inflate the inflatable regions 112 can escape from the inflatable regions 112 after inflation. In various embodiments, a combination of a porous elastomeric material for the elastomeric layer 210 and perforations in the elastomeric layer 210 in the inflatable region 112 may be used. The porosity of the elastomeric material and/or the size and number of perforations through the elastomeric layer may be selected to provide a desired fluid flow rate from the pocket 216 through the elastomeric layer 210. In at least one embodiment, the desired flow rate is less than a flow rate of the fluid from the pressurized fluid source 106 to the inflatable region 112 such that the inflatable region 112 remains inflated when the pressurized fluid source 106 transmits pressurized fluid thereto. When the pressurized fluid source 106 stops transmitting pressurized fluid to the inflatable region 112, the fluid escapes through the porous and/or perforated material and the elastomeric layer 210 at the inflatable region 112 relaxes to the uninflated state.

In at least one embodiment, the fluid channel 204 is in fluid communication with multiple inflatable regions 112. In such embodiments, some of the pressurized fluid transmitted through the fluid channel 204 may continue in the direction of arrow C to additional inflatable regions 112.

FIG. 2C is a cross-sectional perspective view of the protective structure 108, and shows that the at least one aperture 206 may include an arrangement of apertures arranged in two dimensions in the substrate 202. In the embodiment shown in FIG. 2C, the inflatable region 112' is circular. In various other embodiments, the inflatable region 112 could have different shapes, such as an oval, a square, rectangle, or a triangle. In certain embodiments, the inflatable regions 112 could have irregular shapes that match the particular geometry of a portable device 100.

The inflatable regions 112 can be different sizes. For example, in embodiments in which the inflatable regions 112 are circular, the inflatable regions could have diameters of a few millimeters to several centimeters in size. In various other embodiments, an inflatable region 112 could cover almost an entire surface of the portable device 100. For example, an inflatable region 112 could cover the entire screen of a smartphone.

Figure 3:
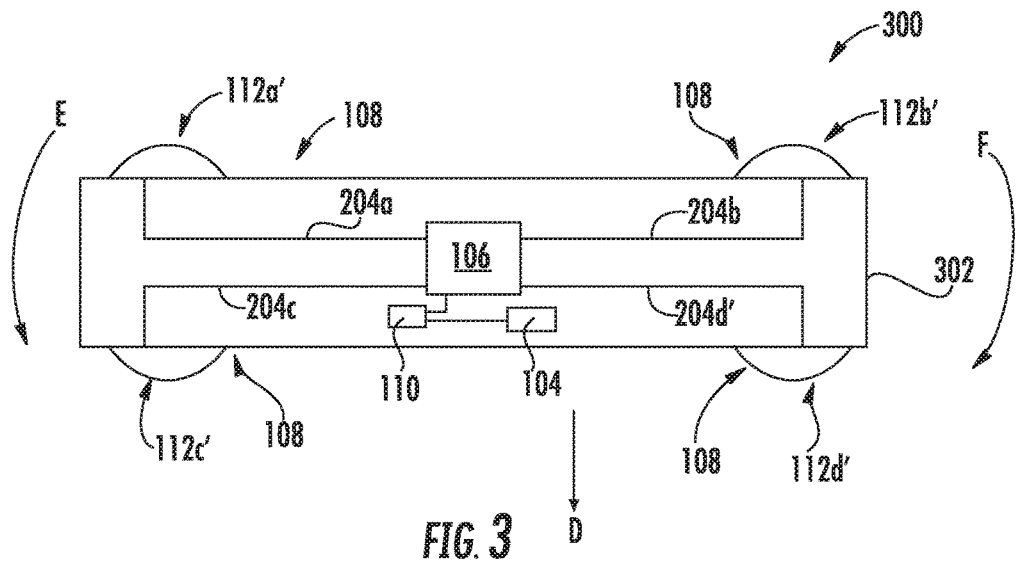
FIG. 3 is a side view block diagram of a portable device with a plurality of protective structures arranged thereon, wherein the plurality of protective structures are connected to a pressure reservoir via a plurality of fluid channels.

FIG. 3 is a block diagram side view of a portable device 300 that includes a plurality of inflatable regions 112 disposed at different locations on a housing 302 of the portable device 300. The inflatable regions 112 are illustrated in the inflated state (indicated by reference numeral 112') for the purposes of illustration. The portable device 300 includes a first fluid channel 204a in fluid communication with the pressurized fluid source 106 and a first inflatable region 112a'. The portable device 300 also includes a second fluid channel 204b in fluid communication with the pressurized fluid source 106 and a second inflatable region 112b'. The portable device 300 also includes a third fluid channel 204c in fluid communication with the pressurized fluid source 106 and a third inflatable region 112c'. The portable device 300 also includes a fourth fluid channel 204d in fluid communication with the pressurized fluid source 106 and a fourth inflatable region 112d'. The first inflatable region 112a' and the second inflatable region 112b' are disposed on one side of the housing 302 for the portable device 300, and the third inflatable region 112c' and the fourth inflatable region 112d' are disposed on an opposite side of the housing 302. The portable device 300 could include additional inflatable regions 112 along edges of the housing 302 and additional fluid channels 204 in fluid communication with the additional inflatable regions 112.

In the event the accelerometer 104 in the portable device 300 detects an acceleration event (e.g., the portable device 300 is dropped), the controller 110 can selectively transmit fluid from the pressurized fluid source 106 to the inflatable regions 112 disposed on the side(s) of the housing 302 calculated to be facing the direction of travel of the portable device 300. For example, if the portable device 300 is dropped and traveling in the direction of arrow D, then the controller 110 will calculate that the third and fourth inflatable regions 112c' and 112d' are disposed on the side of the housing 302 facing the direction of travel. As a result, the controller 110 could transmit instructions to the pressurized fluid source 106 to transmit pressurized fluid to the third and fourth inflatable regions 112c' and 112d' via the third fluid channel 204c and the fourth fluid channel 204d, respectively.

In at least one embodiment, the controller 110 can selectively inflate and/or deflate different ones of the inflatable regions 112 to modify an aerodynamic characteristic of the portable device 300 during and/or after an acceleration event and before impact with a surface to re-orient the portable device 100 for impact. For example, in embodiments in which the pressurized fluid source 106 is a microfluidic pump, the controller 110 and the pressurized fluid source 106 could pump fluid into the inflatable regions 112 to inflate the inflatable regions 112 and could pump fluid out of the inflatable regions 112 to deflate the inflatable regions 112. By selectively inflating and deflating various inflatable regions 112, an exterior profile of the portable device 100 can be modified to affect drag on different portions of the portable device 100, thereby causing the portable device 100 to re-orient itself relative to the direction of travel. To illustrate, consider the above-described scenario in which the portable device 300 is falling in the direction of arrow D. The controller 110 could pump fluid from the pressurized fluid source 106 only to the inflatable region 112d'. Increased drag caused by inflation of the inflatable region 112d' would cause the portable device 300 to rotate in the direction of arrow E. In an opposite manner, the controller 110 could pump fluid from the pressurized fluid source 106 only to the inflatable region 112c'. Increased drag caused by inflation of the inflatable region 112c' would cause the portable device 300 to rotate in the direction of arrow F. The controller 110 could use such selective inflation and deflation of the inflatable regions 112 to favorably orient the housing 302 relative to the direction of travel (e.g., arrow D) for impact. For example, one particular portable device may be most resistant to impact damage by landing on a particular side or edge, and the controller 110 could use such selective inflation and deflation of the inflatable regions 112 to align that particular side or edge with the direction of travel. As a result, the particular edge will contact the ground (or other surface) first, thereby reducing the likelihood of impact damage. In the event the portable device 100 is tumbling, the controller 110 could sequentially inflate and deflate various ones of the inflatable regions 112 to slow the tumbling, if time allows prior to impact with a surface, orient the portable device 100 relative to the direction of travel (e.g., arrow D).

Figure 4:
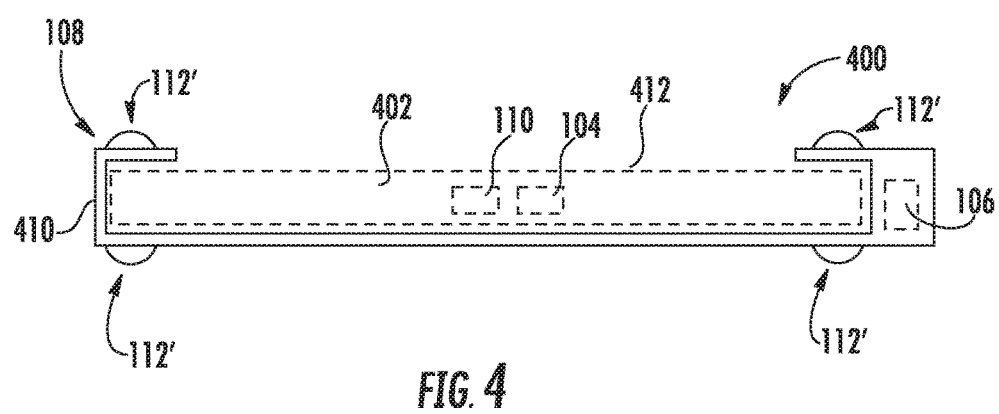
FIG. 4 is a cross-sectional side view of a protective case surrounding a portable electronic device, wherein an accelerometer is disposed in the portable electronic device.

In various embodiments, the protective structure 108 can be incorporated in a protective case for a portable electronic device. FIG. 4 is a side cross-sectional block diagram of a protective case 400 for a portable electronic device 402 (the portable electronic device 402 is illustrated in broken line). The protective case 400 includes a housing 410 that surrounds a significant portion of the portable electronic device 402. For example, the housing 410 completely surrounds the portable device 402 except for a window 412 through the housing 410 that allows a display screen to be viewed. In various embodiments, the housing 410 could include other windows or openings for access to audio jacks, data/power connections, buttons, switches, or other controls. The housing 410 of the protective case includes the protective structure 108 disposed on an outward facing surface of the housing 410. In this embodiment, the protective structure 108 includes four inflatable regions 112. However, additional inflatable regions 112 could be disposed on the same and/or other surfaces or edges of the housing 410. Again, the inflatable regions 112 are illustrated in the inflated state (indicated by reference numeral 112') for the purposes of illustration.

In the embodiment illustrated in FIG. 4, the accelerometer 104 and the controller 110 are disposed in the portable device 402. For example, the accelerometer 104 could be an accelerometer built into a portable device, such as a smart phone or tablet computer. The controller 110 could be a computer processor of the portable device. The controller 110 can communicate with the pressurized fluid source 106, disposed in the housing 410, via a data connection. For example, the housing 410 could include a power/data coupler, such as a male mini USB connector, that mates with a data/power coupler, such as a female mini USB connector, disposed in the portable device 402 when the housing 410 is arranged around the portable device 402. In the event the protective case 400 with the portable device 402 therein is dropped or otherwise experiences an acceleration event, such acceleration event is detected by the accelerometer 104 in the portable device 402. The controller 110 (e.g., computer processor) in the portable device 402 transmits control signals to the pressurized fluid source 106 in the housing 410. In response, the pressurized fluid source 106 inflates one or more of the inflatable regions 112 to cushion any impact.

Figure 5:
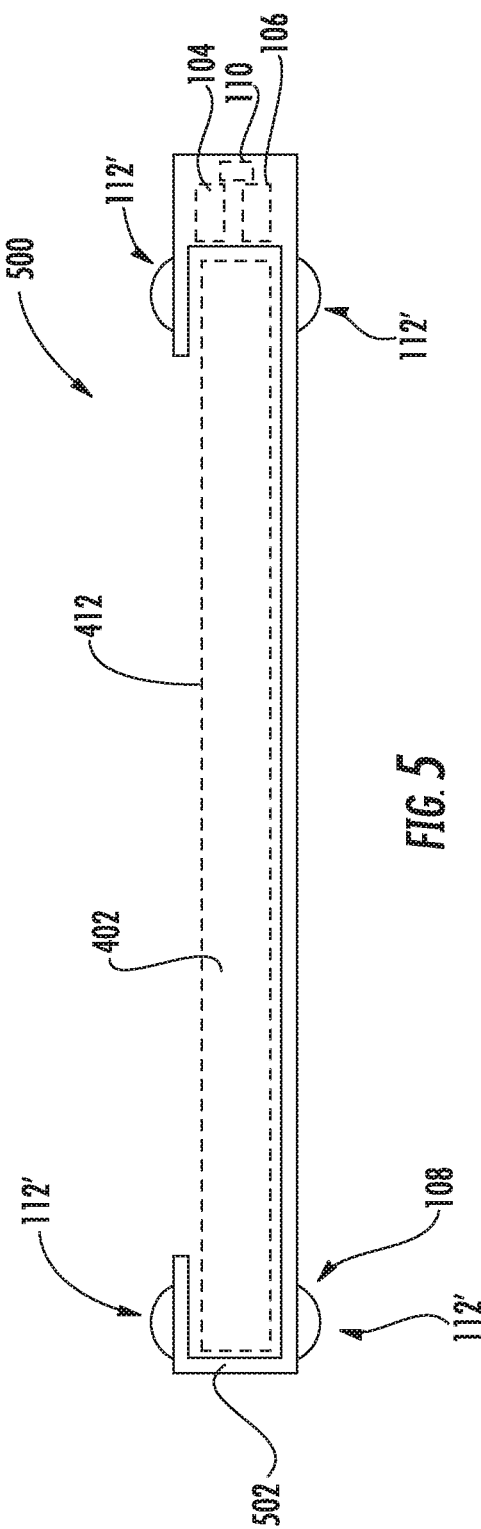
FIG. 5 is a cross-sectional side view of a protective case surrounding a portable electronic device, wherein an accelerometer is disposed in the housing.

FIG. 5 illustrates another protective case 500 in which the accelerometer 104, controller 110, and pressurized fluid source 106 are all disposed in the housing 502 of the protective case. In certain embodiments, the housing 502 may include a battery to provide power to the controller 110, the accelerometer 104, and/or the pressurized fluid source. In other embodiments, the housing 502 may draw power from the portable device 402 via a data/power coupling, such as the mini USB connector discussed above with reference to FIG. 4.

In the above described embodiments, a portable device is protected by selectively inflatable regions of an elastomeric layer. In the event the portable device is dropped or otherwise experiences an acceleration event that may lead to an impact with a hard surface, one or more of the inflatable regions are inflated to provide a cushion for the impact. The cushion can reduce deceleration loads as well as spread the impact forces over a larger area of the portable device, reducing the likelihood that the impact will cause damage to the portable device. When the device is not experiencing an acceleration event, the inflatable regions are uninflated, and therefore do not significantly increase the size of the portable device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the invention may be devised without departing from the basic scope thereof, and the scope thereof is determined by the claims that follow.

What is claimed is:

1. A portable device, comprising:
   a housing;
   an accelerometer disposed in the housing, the accelerometer operable to detect acceleration of the housing;
   a pressurized fluid source disposed in the housing;
   a protective structure disposed on a surface of the housing, wherein the protective structure comprises:
      a substrate; and
      an elastomeric layer arranged on the substrate, wherein the elastomeric layer defines an inflatable region, wherein a fluid channel fluidly couples the inflatable region with the pressurized fluid source; and
   a controller operable to:
      trigger the pressurized fluid source upon detection of an acceleration event by the accelerometer, wherein, upon triggering, the pressurized fluid source transmits pressurized fluid to the inflatable region through the fluid channel to cause the elastomeric layer to inflatably extend away from the substrate; and
      detect a powering off event of the portable device and to trigger the pressurized fluid source to transmit the pressurized fluid to the inflatable region through the channel to at least one aperture to cause the elastomeric layer to inflatably extend away from the substrate upon detecting the powering off event of the portable device.

2. The portable device of claim 1, wherein the elastomeric layer comprises a self-healing material.

3. The portable device of claim 1, wherein the pressurized fluid comprises water.

4. The portable device of claim 1, wherein the pressurized fluid comprises air.

5. The portable device of claim 1, wherein the pressurized fluid source comprises a microfluidic pump.

6. The portable device of claim 1, wherein the pressurized fluid source comprises a pressurized container.

7. The portable device of claim 1, wherein the inflatable region comprises a plurality of inflatable regions, and wherein the fluid channel comprises a plurality of fluid channels in fluid communication with respective ones of the plurality of inflatable regions.

8. The portable device of claim 7, wherein the controller selectively transmits fluid to one or more of the plurality of inflatable regions oriented toward a bottom-facing side of the housing during a free fall event.

9. The portable device of claim 1, wherein in response to cessation of transmittal of the pressurized fluid to the inflatable region, the elastomeric layer returns to an unextended position.

10. A protective case for a portable electronic device, comprising:
    a housing that receives a portable electronic device;
    an accelerometer, the accelerometer operable to detect acceleration of the housing;
    a pressurized fluid source disposed in the housing;
    a protective structure disposed on a surface of the housing, wherein the protective structure comprises:

a substrate; and an elastomeric layer arranged on the substrate, wherein the elastomeric layer defines an inflatable region, wherein a fluid channel fluidly couples the inflatable region with the pressurized fluid source; and a controller operable to:

trigger the pressurized fluid source upon detection of an acceleration event by the accelerometer, wherein, upon triggering, the pressurized fluid source transmits pressurized fluid to the inflatable region through the fluid channel to cause the elastomeric layer to inflatably extend away from the substrate; and detect a powering off event of the portable electronic device and to trigger the pressurized fluid source to transmit the pressurized fluid to the inflatable region through the channel to at least one aperture to cause the elastomeric layer to inflatably extend away from the substrate upon detecting the powering off event of the portable electronic device.

11. The protective case of claim 10, wherein the accelerometer is disposed in the housing.

12. The protective case of claim 10, wherein the accelerometer is disposed in the portable electronic device, and wherein the housing includes a communications module operable to receive data signals from the accelerometer.

13. The protective case of claim 10, wherein the pressurized fluid is water.

14. The protective case of claim 10, wherein the pressurized fluid is air.

15. The protective case of claim 10, wherein the pressurized fluid source comprises a pressurized container.

16. The protective case of claim 10, wherein the pressurized container is replaceable.

17. The protective case of claim 10, wherein in response to cessation of transmittal of the pressurized fluid to the inflatable region, the elastomeric layer returns to an unextended position.

18. A method, comprising:
providing a portable device, comprising:
a housing;
an accelerometer disposed in the housing, the accelerometer operable to detect acceleration of the housing;
a pressurized fluid source disposed in the housing;
a protective structure disposed on a surface of the housing, wherein the protective structure comprises:
a substrate; and
an elastomeric layer arranged on the substrate, wherein the elastomeric layer defines an inflatable region, wherein a fluid channel fluidly couples the inflatable region with the pressurized fluid source; and
a controller operable to trigger the pressurized fluid source upon detection of an acceleration event by the accelerometer, wherein, upon triggering, the pressurized fluid source transmits pressurized fluid to the inflatable region through the fluid channel to cause the elastomeric layer to inflatably extend away from the substrate;
detecting an acceleration event of the portable device;
releasing pressurized fluid from the pressurized fluid source to inflate the elastomeric layer in the inflatable region;
detecting a powering off event of the portable device; and
releasing pressurized fluid from the pressurized fluid source to inflate the elastomeric layer in the inflatable region upon detecting the powering off event.

19. The method of claim 18, wherein the inflatable region comprises a plurality of inflatable regions, wherein the fluid channel comprises a plurality of fluid channels in fluid communication with respective ones of the plurality of inflatable regions, and wherein releasing pressurized fluid from the pressurized fluid source comprises selectively releasing pressurized fluid from the pressurized fluid source to a bottom-facing inflatable region.

20. The method of claim 19, further comprising selectively releasing pressurized fluid from the pressurized fluid source to an inflatable region to modify an aerodynamic characteristic of the housing during an acceleration event.

* * * * *